Patented Feb. 23, 1943

2,311,636

UNITED STATES PATENT OFFICE 2,311,636

MANUFACTURE OF CYANOHYDRINS

Edgar C. Britton, Howard S. Nutting, Myron E. Huscher, and Arthur R. Sexton, Midland, Mich., assignors to The Dow Chemical Company, Midland, Mich., a corporation of Michigan No Drawing. Application April 22, 1940,
Serial No. 331,062

13 Claims. (Cl. 260—464)

This invention concerns an improved process for the manufacture of aliphatic cyanohydrins, and in particular relates to the manufacture of ethylene cyanohydrin.

In preparing lower alkylene cyanohydrins, i. e. ethylene, propylene, or butylene cyanohydrins, by reacting the corresponding alkylene halohydrin with a soluble inorganic cyanide, the reaction has heretofore been carried out in concentrated aqueous or aqueous-alcoholic solution. Thus, Kendall and McKenzie (Organic Syntheses, vol. III, page 57) carry out the preparation of ethylene cyanohydrin by adding an 80 per cent by weight aqueous solution of ethylene chlorohydrin to dry sodium cyanide and thereafter very carefully heating the mixture at a temperature of 45°–50° C. over a period of about seven hours. The precipitated sodium chloride is then filtered from the reaction mixture and washed with acetone, and the ethylene cyanohydrin product is recovered from the filtrate by fractional distillation under vacuum. Such mode of procedure, however, is not satisfactory for large-scale commercial operation since the relatively small volume of the reaction mixture and the presence of undissolved sodium cyanide and sodium chloride render reaction control and maintenance of the required reaction temperature very difficult. The process is further disadvantageous in that it requires the use of concentrated aqueous ethylene chlorohydrin, and necessitates filtration of the reaction mixture and washing of the precipitated salt with relatively large amounts of an organic solvent.

We have now found that the above disadvantages may be avoided by carrying out the reaction in dilute aqueous solution, i. e. in the presence of an amount of water sufficient to hold all of the reactants and products in solution. The reaction takes place smoothly to form the desired cyanohydrin product in excellent yield, and is easily maintained at the desired reaction temperature because of the homogeneous nature of the mixture. Furthermore, by operating in dilute solution the reaction may be carried out at higher temperatures with consequent reduction in reaction time. Also, the halohydrin reactant may be employed in the form of readily available dilute aqueous solutions, and the necessity for filtering the reaction mixture and washing the alkali-metal halide by-product with an organic solvent is eliminated.

We have also found that the alkylene cyanohydrin products may readily be recovered from the dilute aqueous alkali-metal halide solution in which they are formed when operating according to our improved process by extracting such solutions with a selective solvent comprising a substantially immiscible aliphatic ketone, alcohol, or ester. These solvents are in general relatively low-boiling volatile liquids which have excellent solvent power for the lower alkylene cyanohydrins and at the same time do not react therewith. They may be employed alone or in admixture with each other, or in combination with other solvents, such as hydrocarbons, ethers, etc. A preferred group of such solvents consists of the mixed aliphatic ketones containing from four to six carbon atoms, e. g. methyl ethyl ketone, methyl propyl ketone, methyl tertiarybutyl ketone, etc.

As hereinbefore stated, the preparation of lower alkylene cyanohydrins according to the process of the invention is carried out by reacting a lower alkylene halohydrin, e. g. ethylene chlorohydrin, propylene bromohydrin, butylene chlorohydrin, etc., with a soluble cyanide, such as sodium or potassium cyanide, in the presence of sufficient water to hold the entire reaction mixture in solution. Such amount of water varies somewhat with the particular cyanide and alkylene halohydrin reactants employed, but in general is about 1.5–2.0 times the combined weight of the reactants. Thus, in preparing ethylene cyanohydrin by reaction between ethylene chlorohydrin and sodium cyanide we prefer to employ at least 11.5–12.0 moles of water per mole of sodium cyanide. The alkylene halohydrin and cyanide reactants are preferably employed in equimolecular proportions.

The reaction is conveniently carried out by adding an alkali-metal cyanide in the form of an aqueous solution to an aqueous solution of the alkylene halohydrin, while maintaining a reaction temperature of about 45°–90° C., although temperatures as high as 150° C. have been successfully employed. If desired, the reaction may be initiated at a relatively low temperature and the temperature allowed to increase gradually as the reaction proceeds. In many instances it will be found convenient to employ the alkylene halohydrin in dilute solution such as is obtained by neutralizing the reaction product of an olefine and an aqueous hypohalite, or in the form of its water azeotrope. Upon completion of the reaction, as may be determined by analyzing the reaction mixture for cyanide or halide, the alkylene cyanohydrin is obtained in the form of a dilute aqueous solution containing an equimolecular amount of an alkali-metal halide. Such solution may be utilized directly or it may be subjected to extraction as hereinafter described to obtain the cyanohydrin product in pure or concentrated form.

The reaction may also be carried out by adding the inorganic cyanide in dry form to a dilute, e. g. 15-25 per cent by weight, solution of the alkylene halohydrin. Also, the reaction may be carried out in continuous manner as will be apparent to those skilled in the art.

The following table presents data illustrating the effectiveness of several of the organic solvents which we have found suitable to be employed as extractants in recovering ethylene cyanohydrin from aqueous sodium chloride solutions such as are obtained by reacting ethylene chlorohydrin and sodium cyanide in dilute aqueous solution as just described. In each experiment, an aqueous solution containing 18 per cent of sodium chloride and 15 per cent of ethylene cyanohydrin was shaken with two successive portions of the extractant each of volume equal to that of the aqueous solution. The combined extracts were then distilled to recover the ethylene cyanohydrin. The table also includes comparative data on diethyl ether, which has previously been suggested as an extractant for ethylene cyanohydrin.

Table

| Extractant | Ethylene cyanohydrin extracted percent of total |
| --- | --- |
| Methyl ethyl ketone | 77.5 |
| Methyl n-propyl ketone | 61.0 |
| Methyl isobutyl ketone | 45.0 |
| n-Butyl alcohol | 59.0 |
| sec.-Butyl alcohol | 68.0 |
| iso-Butyl alcohol | 60.0 |
| tert.-Butyl alcohol | 73.0 |
| sec.-Amyl alcohol | 53.0 |
| tert.-Amyl alcohol | 66.5 |
| B-(p-teriarybutylphenoxy)-ethyl alcohol | 44.0 |
| Methyl acetate | 72.0 |
| Ethyl acetate | 56.5 |
| Isopropyl acetate | 42.0 |
| Diethyl ether | 19.0 |

In extracting lower alkylene cyanohydrins from aqueous salt-containing solutions thereof, we prefer to operate in a continuous manner, although it is of course possible to employ a batch process. The continuous mode of operation consists essentially in passing the extractant, which comprises a liquid aliphatic ketone, alcohol, or ester which is substantially insoluble in the solution being extracted, upwardly through a vertical extraction column countercurrent to a descending stream of the cyanohydrin solution. The relative rate of flow of the two liquids is preferably the highest which will permit good separation of the extract and aqueous phases. In order to obtain a large area of contact between the two phases and thereby secure more efficient extraction, the extractant may be forced through a spray nozzle or similar device at the bottom of the extraction tower so that the solvent rises through the descending stream of aqueous cyanohydrin in highly dispersed form, extracting more and more cyanohydrin as it ascends.

The extract which is withdrawn from the top of the tower consists essentially of a solution of the cyanohydrin in the extractant and a small amount of dissolved water. The cyanohydrin product is recovered from the extract by subjecting the latter to fractional distillation and the extractant is returned to the tower for reuse. The aqueous phase which is withdrawn from the bottom of the tower usually contains a small amount of the extractant in solution, and the latter may be recovered therefrom by distillation.

As hereinbefore mentioned, a preferred class of solvents for use in extracting lower alkylene cyanohydrins from aqueous salt-containing solutions comprises the mixed aliphatic ketones containing from four to eight carbon atoms. The solvents may be employed individually or in admixture with each other, or in combination with other solvents. Also, they may be employed in the form of their azeotropic mixtures with water, and in fact such mode of operation is to be preferred when extracting cyanohydrin from solutions which also contain relatively high concentrations of dissolved salts. Since the extractant continuously removes a small amount of water during the extraction process, the aqueous salt solution may become concentrated to the point where the salt precipitates from solution and clogs the apparatus. By employing the extractant in the form of its azeotropic mixture with water, however, at most only a very small additional amount of water is removed during the extraction and the tendency for salt precipitation is greatly reduced. Ordinarily this mode of operation is effected simply by employing a cyclic process wherein the extractant is recovered from the extract in the form of its water azeotrope and is returned as such to the bottom of the extraction tower and re-employed.

The following examples will illustrate several ways in which the principle of the invention may be applied, but are not to be construed as limiting the same.

*Example 1*

1.18 kilograms of 45 per cent aqueous ethylene chlorohydrin (6.6 moles) was placed in a flask fitted with a dropping funnel, thermometer, stirrer, and reflux condenser and heated at a temperature of 48°-50° C. while 1.07 kilograms of 30 per cent aqueous sodium cyanide (6.55 moles) was added from the dropping funnel. The mixture was maintained at 48°-50° C. with vigorous stirring for 6½ hours whereby there was obtained 2.234 kilograms of an aqueous solution containing 6.5 moles of sodium chloride, 0.18 mole of unreacted sodium cyanide, and 5.82 moles of ethylene cyanohydrin distilling at approximately 115°-121° C. under 20 millimeters pressure. The yield of ethylene cyanohydrin, based on the sodium cyanide taken, corresponds to 88.8 per cent of the theoretical. The reaction may also be carried out at a temperature of 95° C. in 1½ hours with only a slight decrease in the yield of ethylene cyanohydrin.

*Example 2*

236.5 lbs. of 30 per cent aqueous sodium cyanide (1.44 lb. moles) was added gradually with vigorous stirring to 231.0 lbs. of 50 per cent aqueous ethylene chlorohydrin (1.44 lb. moles) over a period of 2½ hours while maintaining a temperature of about 42°-52° C. After addition of the sodium cyanide solution, heating and stirring were continued for 6 hours, whereby there was obtained 467.5 lbs. of a dilute aqueous ethylene cyanohydrin solution containing an approximately equimolecular amount of sodium chloride. This solution was subjected to counter-current extraction with methyl ethyl ketone in a 3″ by 30' unpacked column. The methyl ethyl ketone, in the form of its water azeotrope, was fed into the bottom of the column at a rate of 4.8 gallons per hour and the extract was withdrawn from the top, whereas the aqueous ethylene cyanohydrin was fed in at the top of the column at a rate of 2.88 gallons per hour. The extract, which consisted of methyl ethyl ketone solution of ethylene cyanohydrin and a small amount of water, was fractionally distilled, whereby there was obtained 93 lbs. (1.31 lb. moles) of ethylene cyanohydrin, corresponding to an overall yield of 91 per cent of the theoretical.

It will be understood, of course, that the extraction process herein disclosed is applicable to the recovery of lower alkylene cyanohydrins from aqueous salt-containing solutions thereof regardless of how they are prepared and is not limited to the particular method of manufacture hereinabove described. Thus, for example, if for any reason it is desired to employ the prior art method of manufacturing cyanohydrins in concentrated solution, the product may advantageously be recovered by diluting the reaction mixture with water to dissolve the precipitated salt and thereafter subjecting the diluted mixture to extraction with a ketone, alcohol, or ester as herein explained.

Other modes of applying the principle of our invention may be employed instead of those explained, change being made as regards the process disclosed, provided the step stated by any of the following claims or the equivalent of such stated step be employed.

We claim:

1. The method of making ethylene cyanohydrin which comprises reacting sodium cyanide with approximately one molecular equivalent of ethylene chlorohydrin at a temperature between about 45° C. and about 150° C. in the presence of at least about 11.5 molecular equivalents of water.

2. The method of making a lower alkylene cyanohydrin which comprises reacting a lower alkylene halohydrin with an alkali-metal cyanide in the presence of an amount of water sufficient to hold the reaction mixture in solution, and thereafter recovering the cyanohydrin product from the reaction mixture by extraction with a mixed aliphatic ketone containing from 4 to 8 carbon atoms.

3. The method of making a lower alkylene cyanohydrin which comprises reacting a lower alkylene halohydrin with an alkali-metal cyanide in the presence of an amount of water sufficient to hold the reaction mixture in solution, and thereafter recovering the cyanohydrin product from the reaction mixture by extraction with methyl ethyl ketone.

4. The method of making ethylene cyanohydrin which comprises reacting ethylene chlorohydrin with sodium cyanide in the presence of an amount of water sufficient to hold the reaction mixture in solution, and thereafter recovering ethylene cyanohydrin from the reaction mixture by extraction with methyl ethyl ketone.

5. The method of recovering lower alkylene cyanohydrins from aqueous salt-containing solutions thereof which comprises subjecting said solutions to extraction with a mixed aliphatic ketone containing from 4 to 8 carbon atoms.

6. The method of recovering lower alkylene cyanohydrins from aqueous salt-containing solutions thereof which comprises subjecting said solutions to extraction with methyl ethyl ketone.

7. The method of recovering ethylene cyanohydrin from aqueous salt-containing solutions thereof which comprises subjecting said solutions to extraction with methyl ethyl ketone.

8. In a method of making a lower alkylene cyanohydrin by reacting a soluble inorganic cyanide with a lower alkylene halohydrin, the improvement which consists in carrying out the reaction in the presence of at least about 11.5 molecular equivalents of water for each molecular equivalent of the inorganic cyanide.

9. In a method of making a lower alkylene cyanohydrin by reacting a soluble inorganic cyanide with a lower alkylene halohydrin, the improvement which consists in carrying out the reaction in the presence of at least about 11.5 molecular equivalents of water for each molecular equivalent of the inorganic cyanide and thereafter recovering the cyanohydrin product from the reaction mixture.

10. The method of making a lower alkylene cyanohydrin by reacting a lower alkylene halohydrin with an alkali-metal cyanide, the improvement which consists in carrying out the reaction in the presence of an amount of water sufficient to hold the reaction mixture in solution, and thereafter recovering the cyanohydrin product from the reaction mixture by extraction with an immiscible liquid lower aliphatic ester of a lower aliphatic alcohol.

11. The method of making a lower alkylene cyanohydrin by reacting a lower alkylene halohydrin with an alkali-metal cyanide, the improvement which consists in carrying out the reaction in the presence of an amount of water sufficient to hold the reaction mixture in solution, and thereafter recovering the cyanohydrin product from the reaction mixture by extraction with an immiscible liquid alcohol.

12. The method of recovering a lower alkylene cyanohydrin from aqueous salt-containing solutions thereof which comprises subjecting said solutions to extraction with an immiscible liquid lower aliphatic ester of a lower aliphatic alcohol.

13. The method of recovering a lower alkylene cyanohydrin from aqueous salt-containing solutions thereof which comprises subjecting said solutions to extraction with an immiscible liquid alcohol.

EDGAR C. BRITTON.
HOWARD S. NUTTING.
MYRON E. HUSCHER.
ARTHUR R. SEXTON.